May 18, 1971   H. M. PATEL   3,579,367

METHOD OF METALLIZING A LUMINESCENT SCREEN

Filed Nov. 22, 1968

WITNESSES:
Leon M. Garman
James F. Young

INVENTOR
Himanshu M. Patel
BY Charles F. Renz
ATTORNEY

United States Patent Office 3,579,367
Patented May 18, 1971

---

3,579,367
METHOD OF METALLIZING A LUMINESCENT SCREEN
Himanshu M. Patel, Pine City, N.Y., assignor to Westinghouse Electric Corporation, Pittsburgh, Pa.
Filed Nov. 22, 1968, Ser. No. 778,260
Int. Cl. H01j *31/20*
U.S. Cl. 117—33.5                             3 Claims

---

ABSTRACT OF THE DISCLOSURE

This invention relates to luminescent screens and to the application of a metallic backing layer thereon. More particularly, this invention describes a method of depositing a double coating of an organic heat removable material over the phosphor in the luminescent screen for the purpose of providing a smooth substrate upon which the metallic backing layer may be deposited.

---

BACKGROUND OF THE INVENTION

This invention is directed to methods of applying a metallic backing to a luminescent screen and more particularly to a color television screen. U.S. Pat. No. 3,067,055 and U.S. Pat. No. 3,317,337, issued to T. A. Saulnier, describe the use of water emulsions to produce an organic substrate for a metallic backing layer for the phosphor screen. U.S. Pat. No. 3,067,055 is directed to the utilization of a single film of water base emulsion while Pat. 3,317,337 is directed to the utilization of a double film of water base emulsion prior to depositing the metallic layer. Some of the industry utilizes a single film of material over the phosphor prior to evaporating the metallic layer. Some of these processes are similar to that described in 3,067,055. These processes may suffer from low light output and also in some cases require a rather complicated baking procedure in order to avoid blistering the metallic layer or incomplete bakeout of the organic film. In summary, the single coating provided a system which was difficult to control for optimum light output; it also required a slow prebake of the screen in order to remove substantially all of the organic material.

The double filming as described in U.S. Pat. 3,317,337 taught the concept of depositing a first organic film over the phosphor which is substantially free of cracks and holes and of a relatively soft acrylic resin. A second coating was deposited on top of this first organic coating of an acrylic resin in a manner to provide a substantially discontinuous coating to provide cracks, holes and gross discontinuity in the second coating. The metallic layer was deposited onto this second or top coat of material.

SUMMARY OF THE INVENTION

This invention is directed to the improved method of manufacturing a color television tube in which a double layer of suitable acrylic resins are deposited onto the luminescent screen prior to the evaporation of a metallic backing layer thereon. These acrylic resins are then removed during bakeout of the tube to provide an improved metallic backing for the luminescent screen.

DESCRIPTION OF THE PREFERRED EMBODIMENT

Figure 1:
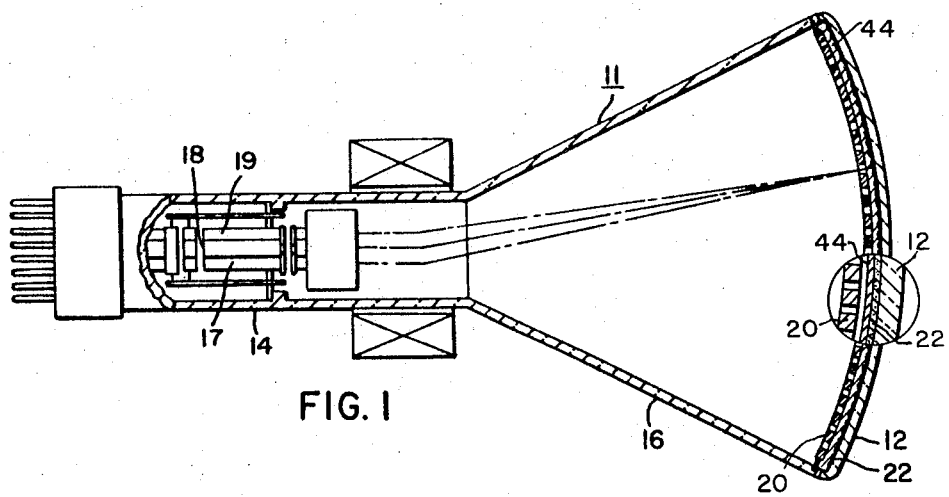
FIG. 1 is a sectional view of a color television tube including a display screen to which my invention may be applied with particular advantage.

The color television tube illustrated in FIG. 1 is generally conventional in construction with the exception of the method and the resulting metallic deposit provided on the luminescent screen. The tube includes an envelope 11 having a transparent face panel portion 12, a neck portion 14 and a flared interconnecting portion 16 between the neck portion 14 and the face panel 12. A display screen 22 is provided on the inner surface of the faceplate portion 12. Three electron guns 17, 18 and 19 are provided in the neck portion 14 to project three individual electron beams which are each controlled by video signals representative of the colors green, blue and red, respectively. A mask member 20 is provided between the electron guns 17, 18 and 19 and the display screen 22 in well-known manner.

The display screen 22 comprises an arrangement of dots 37, 38 and 39 of phosphor material capable of emission of the colors green, blue and red, respectively. Each dot 37, 38 and 39 is capable of emission of only one color. Each of the electron guns 17, 18 and 19 is directed onto only one of the colors so that the electron beam from each of the guns excites only one color. This mask type color television tube is well-known in the art.

In the process of manufacturing, the screen structure 22 is provided on the face panel 12 prior to sealing the face panel 12 to the flare portion 16 of the envelope 11. The face panel 12 is mounted on a suitable holding means and a slurry of a suitable phosphor material is applied thereto. The slurry consists of the desired phosphor, a suitable bonding agent such as polyvinyl alcohol and a suitable photosensitizer such as ammonium dichromate as a suitable specific mixture. The slurry material is distributed over the faceplate by tilting and rotating the face panel. After the slurry has been applied in the excess drain, the slurry is dried. The slurry coating is then exposed to suitable light rays through a shadow mask to record the pattern of dots of a single color on the dried slurry layer. The exposure to light causes the slurry exposed to copolymerize and become soluble to water. The unexposed portion of the slurry layer may then be removed by simply washing the tube with water leaving the pattern of dots. This general procedure is then followed to deposit the other two colors within the three color type tube. The next process in the manufacture of the tube is to provide a suitable coating over the three phosphor layer and then evaporate a suitable metallic material such as aluminum. The general art in this area has been previously discussed and it is to the process of manufacture after deposition of the phosphor screen that this invention is directed.

After completion of the phosphor deposition on the panel to provide the screen, the panel is placed in suitable holding means for application of the acrylic resin coatings. The holding means is also capable of rotating and tilting the panel in a prescribed manner.

Figure 2:
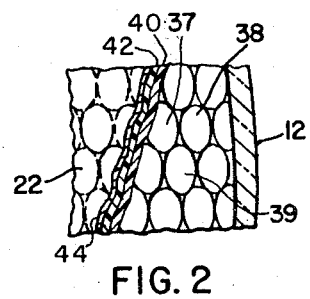
FIG. 2 is an enlarged sectional view illustrating the screen structure prior to bakeout.

A first or undercoat coating 40 is applied to the phosphor screen 22. The coating 40 is a suitable acrylic resin such as a acrylic polymer or copolymer water base emulsion. A suitable material is that commercially available from the Rohm and Haas Company under its trade designation Rhoplex C–72 and contains a mixture of acrylic esters. The properties of this material are a solids content of 45 percent by weight in water, a Tukon hardness of 4.5 and a minimum film forming temperature of 39° C. This material is diluted with water to provide a solids content of 10 to 20 percent by weight. A quantity of about 100 milliliters is dispensed onto the screen surface 22 of the panel. The temperature of the panel is about 100° F. The panel is rotated at about 6 r.p.m. with the panel upright and then is tilted slowly to a down position and rotated at 85 r.p.m. to remove the excess coating material. The panel is then heated to a temperature of about 60 to 65° C. for about three minutes by suitable means such as infrared lamps. The resulting coating 40, as illustrated in FIG. 2, is a smooth continuous coating and is heated well above the film forming temperature in order to insure that a continuous type film is obtained.

The next step in the operation is to dispense a quantity of a second acrylic resin emulsion commercially available from Rohm and Haas under its trade designation Rhoplex B-74. This is a mixture of acrylic esters. This material has a solids content of 38.0 percent by weight in water, a pH of about 3 to 4, a minimum film forming temperature of 41° C., and a Tukon hardness of 11. Here again the material is mixed with water to provide a solids content of about 9 percent and the pH may be modified to about 9.5 by the addition of $NH_4OH$. This second or overcoat coating 42 is applied to the screen 22 with the temperature of the screen about 60° C. and the material is coated over the surface of the undercoat by tilting and rotating the panel in a suitable manner, the excess is then spun off and the screen heated to a temperature of about 60 to 65° C. for a period of about 2 minutes. Here again, the screen is heated well above the minimum film forming temperature to provide a continuous coating 42 over the undercoat 40 as indicated in FIG. 2.

After providing this second organic coating 42 on the screen, an aluminum coating 44 is evaporated onto the top coating 42 and the tube is baked at a temperature of about 450° C. In this baking procedure the temperature is increased at a rate of about 8° C. per minute up until the temperature of 450° C. is obtained, after which the tube is held at this temperature for a period of 15 minutes to one hour. The temperature is then decreased at a rate of about 8° C. per minute to room temperature.

By this procedure, one is able to obtain a relatively tight coating of aluminum on the back surface of the phosphor screen without any substantial crazing or openings provided in the aluminum which tends to reduce the light output of the tube.

Any suitable acrylic polymer or copolymer having a Tukon hardness of less than 5 may be utilized for the undercoat and any acrylic polymer or copolymer having a hardness greater than 5 may be used for the overcoat. Another requirement of the two coatings is than the undercoat will vaporize at a lower temperature than the top coat such that this coating is substantially removed prior to the tube reaching its maximum bakeout temperature. In this manner by providing the organic material utilized to bond the phosphor material which is polyvinyl alcohol and vaporizes at a temperature of about 430 to 450° C., an undercoat which vaporizes at about 390 to 410° C. and a top coat which vaporizes at about 410 to 420° C., a controlled vaporization of the material beneath the aluminum film is obtained so that this material may pass through the aluminum film without rupturing or destroying the film and thus obtaining substantially a continuous aluminum coating over the phosphor screen.

Although the present invention has been described with a certain degree of particularity, it should be understood that the present disclosure has been made only by way of example and that numerous modifications in the method can be resorted to without departing from the spirit and scope of the present invention.

I claim as my invention:

1. The method of metallizing a luminescent screen comprising the steps of depositing a phosphor coating on said face panel including a binding material of a first evaporation temperature, depositing over said phosphor coating an undercoat layer of an acrylic resin having a Tukon hardness of greater than 3 and an evaporation temperature different than said binding material, drying said undercoat layer, depositing an overcoat of an acrylic resin having a greater Tukon hardness than said undercoat layer and an evaporating temperature different from said binding material and said undercoat material, drying said overcoat layer, depositing a metallic coating on said overcoat and heating said screen in such a manner that said binding material, said undercoat material and said overcoat material are removed from beneath and through said metallic coating at substantially different times during said heating cycle without blistering said metallic coating.

2. The method of claim 1 in which the Tukon hardness of said undercoat of about 4.5 and the overcoat has a Tukon hardness of about 11.

3. The method in claim 1 in which the overcoat has a pH of about 9.5.

References Cited
UNITED STATES PATENTS

| | | | |
|---|---|---|---|
| 3,067,055 | 12/1962 | Saulnier, Jr. | 117—46X |
| 3,317,337 | 5/1967 | Saulnier | 117—46X |

ALFRED L. LEAVITT, Primary Examiner

W. F. CYRON, Assistant Examiner

US. Cl. X.R.

117—35, 46